(12) United States Patent
Murray

(10) Patent No.: US 10,108,690 B1
(45) Date of Patent: Oct. 23, 2018

(54) ROLLING SUBPARTITION MANAGEMENT

(71) Applicant: Amazon Technologies, Inc., Reno, NV (US)

(72) Inventor: Edward Paul Murray, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 13/912,076

(22) Filed: Jun. 6, 2013

(51) Int. Cl.
*G06F 17/30* (2006.01)

(52) U.S. Cl.
CPC .............................. *G06F 17/30584* (2013.01)

(58) Field of Classification Search
CPC .............. G06F 17/30584; G06F 17/30; G06F 17/30587; G06F 17/30312; G06F 17/30315; G06F 17/30377; G06F 17/30489; G06F 17/30539; G06F 17/30286; G06F 17/30067; G06F 3/067; G06F 17/30575; G06F 17/30097; G06F 17/30864; G06F 17/30867; G06F 17/30156; G06F 17/30159; G06F 17/3082; G06F 17/30828; G06F 17/24
USPC ........................................................ 707/609
See application file for complete search history.

(56) References Cited

U.S. PATENT DOCUMENTS

| | | | | |
|---|---|---|---|---|
| 5,729,700 A * | 3/1998 | Melnikoff | .............. | G06Q 40/06 705/36 R |
| 6,334,141 B1 * | 12/2001 | Varma | ................ | H04L 12/1813 709/201 |
| 6,449,350 B1 * | 9/2002 | Cox | .................... | H04Q 3/0091 379/112.03 |
| 7,181,731 B2 * | 2/2007 | Pace | ........................ | G06F 8/60 707/999.01 |
| 8,510,538 B1 * | 8/2013 | Malewicz | ................. | G06F 7/38 712/220 |
| 8,560,584 B2 * | 10/2013 | Gao | .................. | G06F 17/30306 707/608 |
| 8,601,112 B1 * | 12/2013 | Nordstrom | ......... | G06Q 10/0631 707/600 |
| 8,768,970 B2 * | 7/2014 | Cookson, Jr. | ..... | G06F 17/30864 707/797 |
| 8,903,805 B2 * | 12/2014 | Lee | .............................. | 707/718 |
| 2002/0049759 A1 * | 4/2002 | Christensen | ........ | G06F 11/3404 |
| 2004/0059757 A1 * | 3/2004 | Hardman | ............ | H04L 67/1095 |
| 2006/0190943 A1 * | 8/2006 | Haeri | .................... | G06F 9/4887 718/103 |
| 2009/0327339 A1 * | 12/2009 | Berger | .............. | G06F 17/30592 |
| 2011/0153570 A1 * | 6/2011 | Kim | .................... | G06F 11/1662 707/652 |

* cited by examiner

*Primary Examiner* — Scott A. Waldron
*Assistant Examiner* — Andalib F Lodhi
(74) *Attorney, Agent, or Firm* — Davis Wright Tremaine LLP

(57) ABSTRACT

Tables in the database management system may be divided into partitions, and partitions may be further subdivided into subpartitions. Subpartitions may be ordered on time or date values and boundaries between subpartitions may be defined based on various time-based intervals. A subpartition management policy may be defined. Older subpartitions may be automatically deleted, moved to archival storage or moved to a secondary database. Subpartitions may be automatically created and reserved for future use. Preexisting subpartitions may be automatically split and merged into new subpartitions conformant to the subpartition management policy.

20 Claims, 9 Drawing Sheets

ROLLING SUBPARTITION MANAGEMENT

BACKGROUND

A hosted database management system may be provided as a service operated by a hosting provider on behalf of its customers. These services allow for a customer to store and retrieve data from the database without requiring the customer to incur the technical and administrative overhead of operating a database in their own facilities. This overhead may be significant, including factors such as equipment purchases, salaries for technical personnel and so forth. These factors may continue throughout the lifetime of the database, and may increase as the volume of data stored by the system increases.

One approach to handling large data volumes involves partitioning tables, an approach in which a table is split into two or more segments, each of which may be hosted on a separate computing node. This approach distributes workload and storage requirements over a number of computers, and also allows the hosting provider to use relatively inexpensive hardware, sometimes called commodity servers, instead of the larger and more expensive servers that would be required if the data were to be hosted on a single system.

A further approach to handling large data volumes may be called subpartitioning, which involves splitting the data in each partition into two or more groups. For example, a partition might divide the data in a table based on a customer's last name. If a given partition handled customers whose last name began with the letters "A" through "M," a subpartition might correspond to data for those customers for the month of July. Subpartitioning the data may have various benefits, such as improved performance and flexibility. There may, however, be various administrative challenges related to subpartitioning, such as potentially large numbers of subpartitions—a table with ten partitions and ten subpartitions each would, for example, have 100 subpartitions. For the providers of hosted database services, the number of subpartitions may be further increased by the potentially large number of tables being managed on behalf of the provider's customers.

BRIEF DESCRIPTION OF DRAWINGS

The drawings provided herein are designed to illustrate example embodiments and are not intended to limit the scope of the disclosure.

DETAILED DESCRIPTION

Figure 1A:
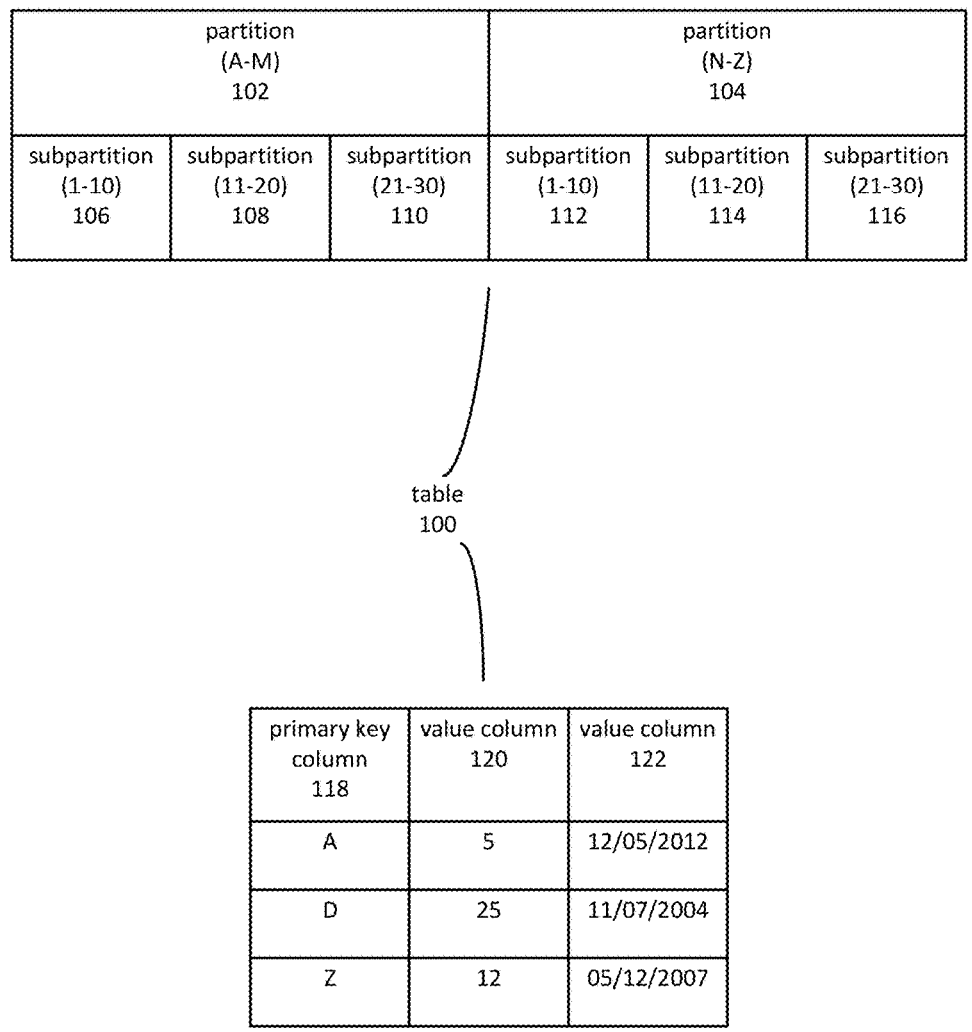
FIG. 1A is a block diagram depicting an illustrative example of partitioning and subpartitioning a database table.

Hosted database services may manage large volumes of data on behalf of customers. The database services may be accessible through various means such as web pages, web services, application programming interface ("API") and so forth. The database services may be accessed by various customer applications that may, for example, communicate over the Internet to a data center that hosts the database services. In order to limit costs, the amount of data that can be maintained by the database service on behalf of any given customer is limited. The customer might, for example, be charged greater amounts as the amount of storage capacity made available to the customer increases.

The provider of a hosted database service may offer features such as support for automatic backups, data retention policies, point-in-time backup recovery, and forward-looking provisioning of storage capacity. These features may help the customer to manage the cost of using the database services because data that is no longer needed, or data that might be moved to a low-cost storage location, may be conveniently moved.

Database services may handle very large volumes of data, even when they provide convenient methods of managing older data. One method of handling large volumes of data is known as partitioning. Partitioning involves splitting a set of data, such as a table, into two or more parts, each of which contains a portion of the set of data. Each partition may be hosted on a separate computing node. This approach may allow for both larger storage volumes and improved performance, because storage requirements and workload demands may be spread out over multiple hardware platforms. In some cases, there may be a one-to-one relationship between partitions and computing nodes, so that each computing node hosts a single partition. In other cases, multiple partitions may be hosted on a single computing node. These partitions may be from the same table, or from multiple tables.

Horizontal partitioning divides a table based on rows, using one or more columns of the table as a key. For example, a table might have a primary key column containing the letters "A" through "Z." The table might be split into two partitions. The first partition might contain all of the rows whose primary key column contains values from "A" to "M," while the second partition might contain all of the rows whose primary key columns contain values between "N" and "Z." Horizontal partitions may be defined based on other columns, or combinations of columns, in addition to primary key columns.

A key column might be used to partition data according to a natural ordering, such as the alphabetical ordering just described. As an alternative, a key value might be applied to a hash function to determine the partition for each row in the table. A hash function maps input values to outputs in a way that may act to randomize partition assignments. An advantage to this approach is that it can help evenly distribute workload among multiple partitions.

A partition may also be subdivided into subpartitions. The subpartitions may be based on the same key as the partitioning scheme, or may be based on an alternative. In some cases, a date or time value may be used to subpartition data. This approach may allow for older data to be deleted from the system or moved to a more cost-effective repository. Various other types of keys, or combinations of keys, may also be employed to define a subpartition.

FIG. 1A depicts an illustrative example of a partitioning and subpartitioning scheme. For purposes of the example, table 100 is assumed to comprise primary key column 118, value column 120, and value column 122. The table may be partitioned on two levels. A first level of partitioning may be based upon primary key column 118. FIG. 1A depicts two partitions at this level, partition 102 containing rows having primary key values A through M, and partition 104 containing rows having primary key values N through Z. FIG. 1A depicts partitioning based on a natural ordering of data. However, partitioning may be based on non-natural ordering. For example, a hash function might be applied to the values in primary key column 118 to determine a partition for the corresponding row. Embodiments might also base the first level of partitioning on a hash function applied to a portion of each value in primary key column 118.

A second level of partitioning, referred to as subpartitioning, may also be applied to table 100. A different key, or different portion of a key, may be employed to determine the applicable subpartition. An embodiment might use the first portion of values in primary key column 118 to determine the applicable partition and the first level, and a second portion of the primary key values to determine the applicable subpartition. Other embodiments might employ a different key. In FIG. 1A, first-level partitions 102 and 104 are depicted as being based upon alphabetic values found in a row's primary key column, while subpartitions 106, 108, 11, 112, 114 and 116 are depicted as being based upon numerical values found in value column 120. Other columns, such as value column 122, might also be employed alone or in combination. Value column 122 depicts a time-ordered field. Subpartitions may be time-ordered so that older data may be removed from the system to make room for newer data. This approach may be referred to as rolling subpartitioning, because when a new subpartitions are added it is assigned to a future interval or a present interval, and over time rolls over to represent a past interval. Subpartitions representing past intervals may then be removed after a period of time.

Figure 1B:
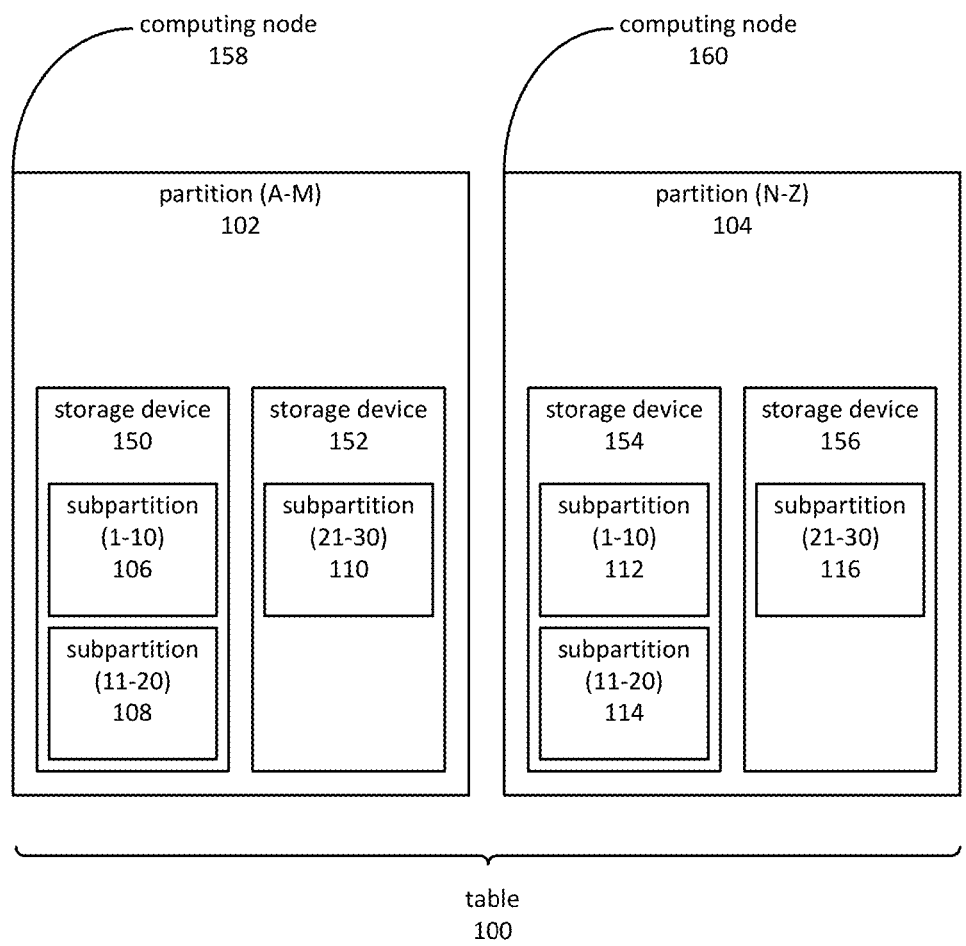
FIG. 1B is a block diagram depicting an illustrative example of partitioning and subpartitioning a database table, further illustrating storing subpartitions on a plurality of computing nodes and storage devices.

FIG. 1B is an alternate view of table 100 that depicts an illustrative example of locating partitions and subpartitions on computing nodes and storage devices. Partition 102 may be located on computing node 158, and partition 104 may be located on computing node 160. Locating partitions on separate computing nodes may allow for workload and storage requirements to be evenly distributed. Locating a partition may therefore involve assigning the partition to a particular computing node. However, when subpartitions are employed the storage location of a partition's data may be determined on a subpartition-by-subpartition basis.

Partition 102 is located on computing node 158 and comprises three subpartitions 106, 108 and 110. Two of these subpartitions, 106 and 108, are located on storage device 150, which may be coupled to computing node 158. A third subpartition 110 may be located on a separate storage device 152 also coupled to computing node 158. Subpartitions may be associated with different storage devices on the basis of various factors, such as read or write hotspots. Some subpartitions may be subject to a higher frequency of reads or writes than other subpartitions. One example is time series data, which may involve a greater proportion of writes clustered around the most recent time period. Accordingly some partitions may be assigned to a separate storage device or to a device whose performance characteristics are optimal for the read or write pattern associated with the partition.

Partition 104, located on computing node 160, may be configured similarly to partition 102. Storage device 154 may store data files corresponding to subpartitions 112 and 114 and storage device 156 may store data files corresponding to subpartition 116. It may be the case that usage or storage patterns seen on one partition may be seen on other partitions. For example, if subpartitioning is based on dates or times, the most recent data may be subject to a hotspot regardless of the top-level partitioning scheme.

A subpartition may comprise one or more files stored on a storage device. A database management system may track the locations of these files through a metadata catalog or other mechanism. The metadata catalog may also contain information defining the data interval that the subpartition will contain. An interval may be defined on the basis of various factors that define the ordering of the data, such as the key columns used to order the data, how the key columns are sorted and so forth. The definition of the interval may also contain information indicative of the range of data contained within each subpartition, such as a distance between the minimum and maximum key column values. Intervals may also be fixed to start or end on certain points. Examples of intervals include monthly, weekly, daily, sliding windows and so forth. Intervals may typically be defined over date and time information, but there are numerous other types of data upon which intervals may be defined. When an interval is defined using time or other monotonically increasing values, the interval may be specified by indicating an ending value for the partition.

The ordering of data may be referred to using ordinal positions. For convenience, the earliest data may be referred to as being first, while the latest data may be referred to as last. Data that is neither first nor last may be described by referencing some other ordinal position or relative position. In the context of rolling subpartitions, the first or earliest data may be subject to removal, while the last or latest subpartition may be reserved for future use.

Large databases may have a number of partitions, each of which may have a number of subpartitions. In environments where data volumes and storage capacity is carefully managed, there may be a large number of subpartitions, which may impose significant administrative overhead.

In a hosted database system, it is desirable to automate subpartition management tasks because of the large number of subpartitions that may exist, and numerous alternative rules that may apply to different customers. Each customer may wish to have different policies regarding retention of data, reserved space for future data and so forth. Manual administration of a different subpartition management scheme for each customer might become unwieldy. Accordingly, embodiments of hosted database systems may provide mechanisms for allowing customers to define policies governing how subpartitions are to be managed, and to provide mechanisms for automatically administering those policies.

Figure 2:
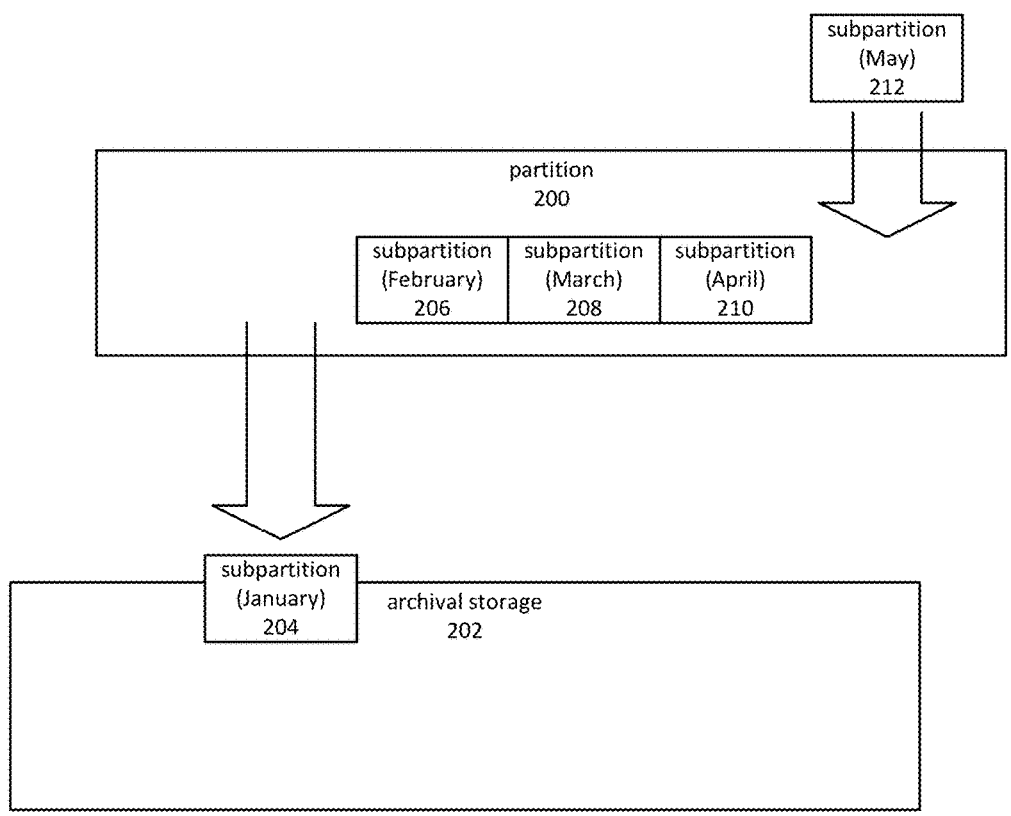
FIG. 2 is a block diagram depicting an illustrative example of administrative tasks related to subpartition management.

Administrative tasks associated with subpartitions include deleting partitions that are no longer needed, archiving partitions, creating new partitions for data that will be received in the future and forecasting required storage space. FIG. 2 depicts an illustrative example of typical administrative tasks. Partition 200 might be one of a number of first-level partitions of a table, based on any of the partitioning techniques described herein. Initially, partition 200 might consist of four subpartitions 204, 206, 208 and 210. Each subpartition may comprise one or more files stored on one or more storage devices. The size of the files may grow to considerable size, such that it becomes cumbersome to maintain all of the subpartitions on a single device. Furthermore, in the context of hosted database services, customers may not wish to pay for the storage necessary to maintain all of the subpartitions. Embodiments may therefore provide a mechanism for customers to define policies governing how subpartitions are managed, and manage subpartitions automatically according to the policies defined by the customer.

A rolling subpartition management scheme may be implemented according to policies defined by the customer. A customer policy might, for example, specify that a maximum of four months of data is to be retained on each partition. As depicted in FIG. 2, near the end of the month of April subpartition 204 might be moved to archival storage 202, while a new subpartition 212 may be added to a storage device associated with partition 200. The new subpartition 212 may be empty, in that it does not contain row data. Database management systems may, however, create empty partitions so that the necessary structures are arranged as needed to store data as it is added, for example by reserving space on the storage device to accommodate the expected amount of data.

Figure 3A:
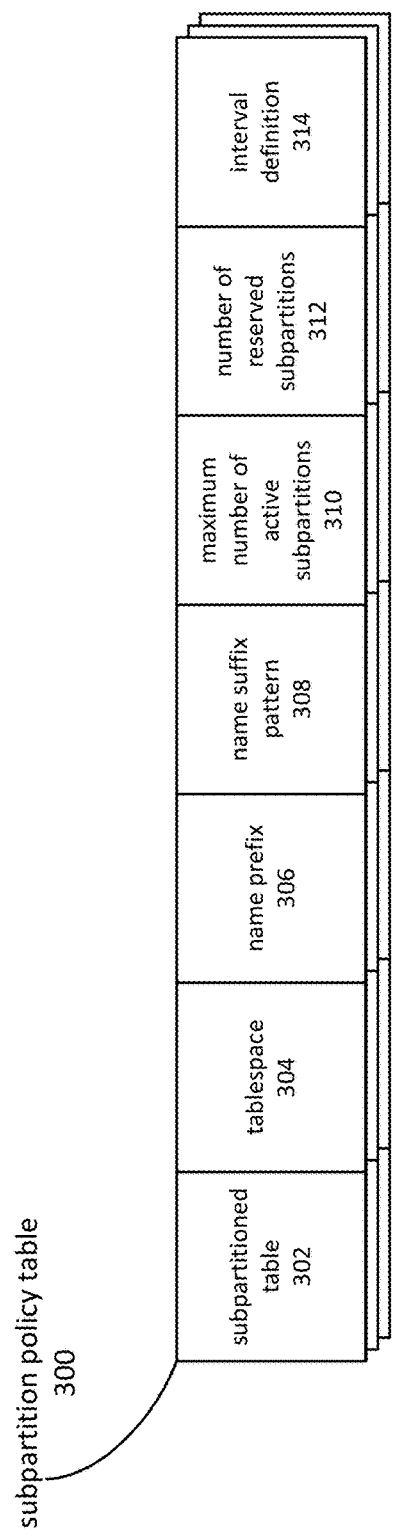
FIG. 3A is a block diagram depicting an embodiment of a table containing definitions of a policy for managing subpartitions.

A metadata catalog, table or similar mechanism may be employed to manage subpartition policy information. FIG. 3A depicts subpartition policy table 300, which contains descriptions of subpartitioning policies for tables maintained by a database management system. Each row in subpartition policy table 300 may correspond to the policy for a subpartitioned table 302.

In various embodiments, subpartitions may be members of a logical or physical grouping of database objects, which may in various embodiments be referred to as a tablespace, file group, schema container and so forth. Some of these, such as tablespaces, involve an association with a group of files that contain subpartition data and may also contain indexes or other related structures. Others may comprise a logical grouping with no direct physical counterpart. Indexes within a tablespace may be configured to refer only to subpartitions also within the same tablespace. If so, the subpartitions in the tablespace and the index within the tablespace may be dropped at the same time.

In FIG. 3A, subpartition policy table 300 may contain a column, tablespace 304, that may indicate which tablespace, or other physical or logical grouping, the subpartitions should be associated with. Some embodiments may provide for a tablespace name pattern instead of or in addition to a fixed tablespace name. For example, a pattern might be specified for tablespace 304 that indicates that once each quarter the tablespace name should be changed, for example from "Q1" to "Q2."

Each subpartition may be assigned a unique name, which may, in some embodiments, correspond to a file to be located on a storage device or within a tablespace. One approach to naming involves concatenating a fixed name prefix 306 with a suffix generated by applying name suffix pattern 308. The pattern may specify variables for substitution, such as variables representing the current day, month and year. Various additional elements may be included in the subpartition name, such as a serial number or the date on which the subpartition was created.

Subpartitions may be categorized, in general terms, as being active or reserved. Under this loose classification scheme, a reserved subpartition is one that is empty but has the potential to receive data. A subpartition that is not reserved may be considered active. Depending upon the subpartitioning scheme, some active partitions may receive very little additional data. For example, if data is subpartitioned according to date, very little data may be added to older subpartitions. However, as used herein the term active subpartition encompasses partitions that are subject to any amount of traffic, and reserved partitions are those not yet used to store data.

A column in subpartition policy table 300 may specify a maximum number of active subpartitions 310. This value may be employed by various embodiments to limit storage used by a partition and to predict future storage requirements. When the addition of a new subpartition would cause the maximum value to be exceeded, another subpartition might be removed. The removed subpartition might be the oldest if the subpartitioned are ordered according to date or time. For other subpartitioning schemes, the "oldest" subpartition may be defined as the subpartition at the end opposite to the new subpartition.

In some embodiments, subpartition policy table 300 may include a value corresponding to a minimum number of active subpartitions, or in other words subpartitions that correspond to current or past time intervals. Active subpartitions may be created without data but with a sufficient amount of space reserved for data that is expected to be added.

Another column in subpartition policy table 300 may correspond to a minimum number of reserved subpartitions 312 to preallocate. Reserved subpartitions may be created to contain space that is set aside to contain new data corresponding to future intervals. As the database operates, reserved partitions may transition to an active state and new reserved subpartitions may be added.

Each subpartition may be associated with an interval as defined by a column of subpartition policy table 300, such as interval definition 314. An interval definition may comprise a variety of indicators. One example is an enumerated value indicating an interval type such as daily, weekly, monthly, quarterly, yearly and so on. Intervals may also be defined in terms of a sliding window or distance between endpoints in a range of data. Intervals may be defined in reference to one or more columns in the subpartitioned table indicated by column 302. For example, interval definition 314 might comprise the name of a column that functions as a key for the subpartition being defined.

Embodiments may retrieve an applicable subpartition management policy from subpartition policy table 300 by querying the table. A subpartition management routine may, for example, be invoked with a table name as a parameter. The routine might then query subpartition policy table 300 for a policy applicable to that table.

Various structures other than a dedicated table may be used to maintain applicable policies. In some embodiments, policy definitions may be retrieved or inferred from metadata catalogs. Database management systems may maintain metadata catalogs with information describing various structures, such as tables, indexes and so forth. A metadata catalog might also provide additional space for extensions, which could contain subpartition management policy definitions. Alternatively, database objects can be named to indicate that they should adhere to a particular policy. Embodiments may predefine a set of available policies, so that the necessary data may be obtained by reference to the applicable policy.

Figure 3B:
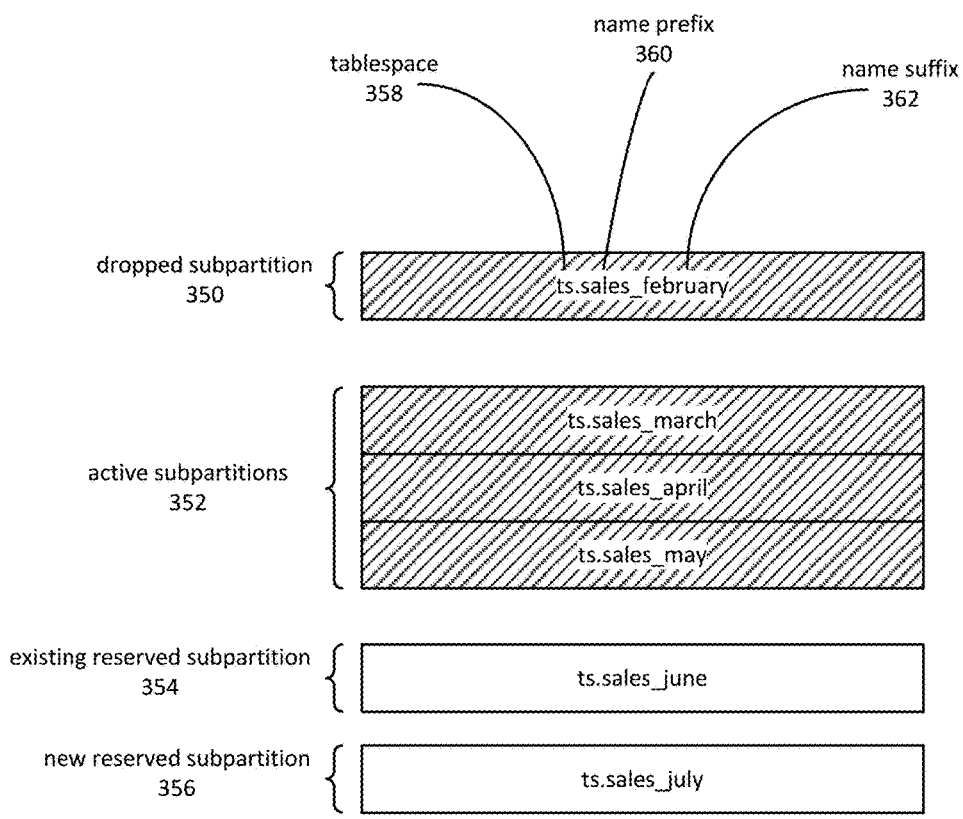
FIG. 3B is a block diagram depicting a rolling subpartition scheme corresponding to a subpartition policy definition.

FIG. 3B depicts a subpartitioning scheme in accordance with the information depicted in FIG. 3A. For illustrative purposes, FIG. 3B depicts a set of subpartitions during a rollover process. The corresponding entry in the subpartition policy table 300 might have indicated a maximum number of active subpartitions as three, a number of reserved subpartitions as two, and an interval definition as monthly. These values may be defined in the table by tablespace 304, maximum number of active subpartitions 310, number of reserved subpartitions 312, and interval definition 314, respectively.

In FIG. 3B, dropped subpartition 350 has a name comprising tablespace 358, name prefix 360, and name suffix 362. These values may be generated based at least in part on tablespace 304, name prefix 306, and name suffix pattern 308 as depicted in FIG. 3A. Name prefix 306, for example, might be specified as "sales," while name suffix pattern 308 might be specified as "% tB," or other pattern indicating that the subpartition should be named using a month name as a suffix. Some embodiments may presume a suffix based on the interval type, and subpartitions may also be named partly based on an incrementing numeric value, which may for example be appended to the end of the subpartition name.

FIG. 3B depicts dropped subpartition 350 as being dropped in order to maintain a maximum number of three active subpartitions 352. Similarly, new reserved subpartition 356 is shown being added to existing reserved subpartition 354 so that there are two reserved subpartitions, corresponding to the assumed entry of two in the corresponding number of reserved subpartitions 312 column in subpartition policy table 300.

Embodiments may provide various mechanisms for customers, database administrators and so forth to define new policies for managing subpartitions, or for editing existing policies. The mechanisms for creating or editing policy definitions, or for receiving definitions of new or edited policies, may include web pages, web services, APIs and so forth. Techniques described herein, such as those described by FIG. 4 and FIG. 5, may be employed to create a set of subpartitions that conform to the new or edited policy and to move or copy data from preexisting non-conformant subpartitions to conforming subpartitions.

Figure 4:
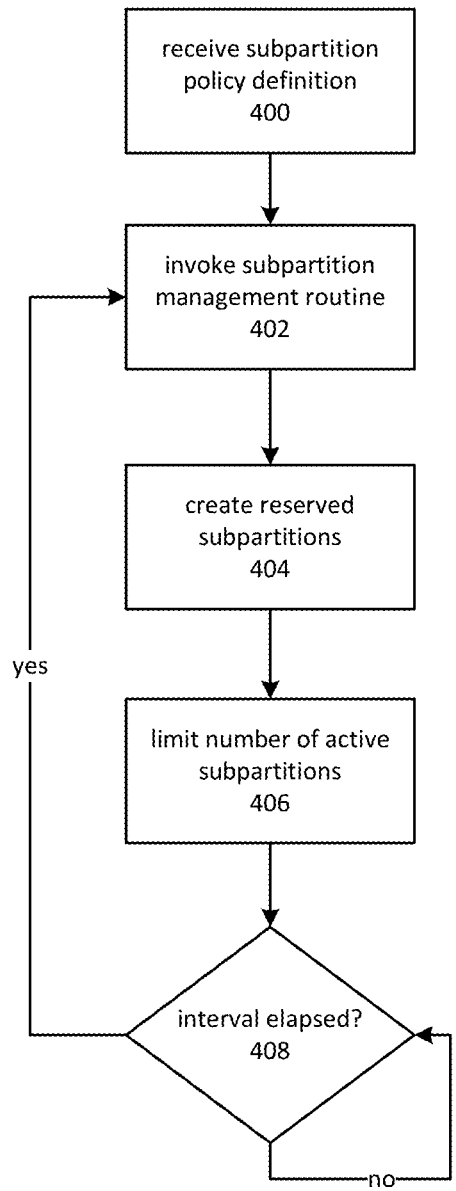
FIG. 4 is a flowchart depicting an embodiment of creating and maintaining a rolling subpartition management scheme.

A subpartitioning policy may be applied to an initially empty table and then maintained on an ongoing basis. FIG. 4 depicts an embodiment for initiating and maintaining a subpartitioning policy. Although depicted as a sequence of operations, those of ordinary skill in the art will appreciate that at least some of the depicted operations may be altered, omitted, reordered or performed in parallel.

Operation 400 depicts receiving a subpartitioning policy definition. A subpartition policy definition may contain various pieces of information defining the intervals on which data such be subpartitioned, the number of active subpartitions to retain, and the number of reserved subpartitions. The policy may be received by various components, including but not limited to an administrative module running on the partition, or an administrative module that is invoked upon the subpartitioning policy being received. Embodiments may employ various means to allow subpartitioning policies to be defined or edited, such as web pages, APIs and so forth. Embodiments may also access a subpartition policy definition corresponding to a table by retrieving it from a table such as subpartition policy table 300, which may for example be stored in the database management system's metadata catalog. Aspects of the subpartitioning policy definition may be inferred from the subpartitions created when a table is created. For example, the interval to be associated with new reserved subpartitions might be inferred from the interval applicable to existing subpartitions. In addition, some database management systems may allow for a table to be defined with rolling subpartition characteristics. This information may be used to infer that the table should conform to a subpartition policy, and what the contents of the policy should be.

A subpartition management routine may be invoked, as depicted by operation 402, to implement and enforce the subpartitioning policy. The routine may comprise any combination of executable code, including but not limited to query language statements, procedural code, object-oriented code or functional code. The code may be embodied in various forms or combinations of forms such as executable programs, libraries, database packages, stored procedures and so forth. Embodiments may utilize procedures available through the database management system to add subpartitions, drop subpartitions, or obtain information about existing tables, partitions and subpartitions. The subpartition management routine may be manually invoked by a database administrator, or may be run periodically or based on a trigger or other event-handling mechanism. Embodiments may provide for customer redefinition of the subpartition management policy, through various interfaces such as web pages or APIs. If so, the subpartition management policy may be triggered automatically when the redefined policy is invoked.

The subpartition management routine acts to ensure compliance with the applicable subpartition management policy. This may include ensuring that any existing subpartitions conform to the intervals and naming patterns defined by the policy. It may also include creating the minimum number of reserved subpartitions and removing older subpartitions to adhere to the maximum number of subpartitions indicated by the policy. The policy may also specify if removed subpartitions should be archived, sent to the customer and so forth.

At operation 404, the routine may create a number of reserved subpartitions, based on information in the subpartition management policy such as the number of reserved subpartitions 312 in FIG. 3. A subpartition may be added when a count of subpartitions falls below a minimum number of subpartitions. The minimum number may be specified in the subpartition management policy. The policy may also specify information indicative of the amount of space to be reserved, the rate at which data is expected to be added to the subpartition, when the subpartition is expected to become active and so forth. Embodiments may create reserved subpartitions as files with enough empty space to contain all of the data they are expected to contain. Some embodiments may not create a file, but will reserve space on the corresponding storage device.

When the corresponding table or partition is first created, there may initially be only a single active subpartition. Operation 406 involves limiting the number of active subpartitions to a maximum value defined in the corresponding subpartitioning policy, and accordingly will not be needed until at least one additional subpartition is added. Over the course of operation, the database management system may add additional partitions. Upon subsequent invocations of the management routine, a count of the number of active subpartitions may be compared to the maximum specified in the policy, and excess subpartitions may be removed.

The management routine may be called periodically to allow the policy to be enforced. Operation 408 depicts determining whether a sufficient interval has elapsed to warrant an additional invocation of the management routine. A sufficient interval for invoking the management routine might be defined with respect to the intervals represented by the subpartitions. However, those of ordinary skill in the art will appreciate that alternative embodiments may employ a number of techniques to ensure that the appropriate management routines are called with sufficient frequency.

On subsequent invocations, the management routine may cause additional reserved subpartitions to be created, and may cause one or more existing subpartitions to be removed. The removed subpartitions might be deleted, or moved to an archival storage location. Various operations may be performed on the removed subpartitions, such as compressing the corresponding files or removing unused reserved space. Various index structures might also be updated to remove references to data contained in deleted subpartitions, or to update the references to refer to the new storage location of subpartitions that have been moved.

Figure 5:
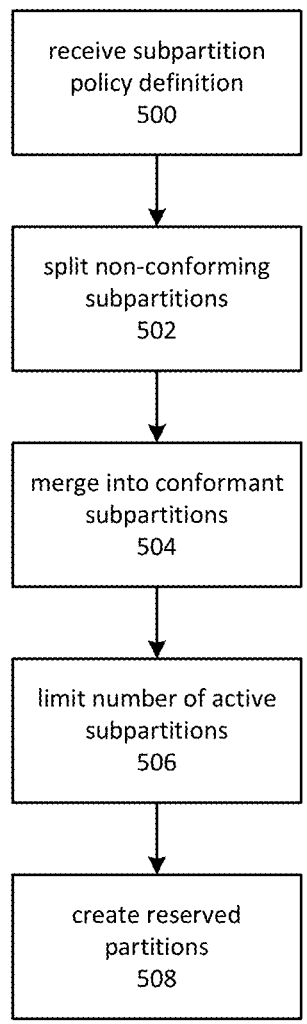
FIG. 5 is a flowchart depicting an embodiment of creating new subpartitions from existing subpartitions that are not conformant with a new subpartitioning scheme.

Subpartitioning may be done on data that resides in an existing partition. In some cases the partition may initially have no subpartitions, or it may already be subpartitioned according to a different subpartitioning scheme. In the latter case, embodiments may provide for automated reorganization of the existing data, so that it may conform to the new subpartitioning scheme. FIG. 5 depicts an embodiment of a process for applying a new subpartitioning scheme to data that has been previously subpartitioned using a different scheme. Although depicted as a sequence of operations, those of ordinary skill in the art will appreciate that at least some of the depicted operations may be altered, omitted, reordered or performed in parallel.

In general terms, the operations depicted in FIG. 5 may be employed to identify a subset of rows or items in preexisting subpartitions that should be merged into new subpartitions that conform to the subpartition management policy. The applicable subset would be the data in the preexisting subpartitions that falls within the relevant data interval.

Operation 500 depicts receiving a subpartition management policy definition. As previously noted, a subpartition policy definition may contain various pieces of information defining the intervals on which data may be subpartitioned, the number of active subpartitions to retain, and the number of reserved subpartitions. Receiving the subpartition management policy may involve querying a subpartition policy table or other table containing policy definitions, and receiving the results of the query. Embodiments may also receive the subpartition management policy definition subsequent to a customer creating or editing the policy using various mechanisms such as a web page or API.

If data has been previously subpartitioned, the existing subpartitions may not conform to the desired new subpartitioning scheme. For example, data might initially be subpartitioned based on weeks. The new subpartitioning scheme, on the other hand, might be based on months. The week-based subpartitions may not align with the desired month-based subpartitions, for example because a week's worth of data might span more than one month.

Operation 502 depicts splitting non-conformant subpartitions into conformant subpartitions. A subpartition may be described as conformant when the data it contains falls within the appropriate interval. For example, a month subpartition might be conformant if it contains data pertaining only to a single month. Splitting a non-conformant subpartition might involve creating one or more new subpartitions, each of which is conformant, out of a single initial non-conforming subpartition. A week-based subpartition, for example, might be split into two new subpartitions, each representing a different month.

Various techniques may be employed to identify non-conformant subpartitions. Embodiments may, for example, examine the names of preexisting subpartitions to determine if they conform to the naming pattern. Another approach involves maintaining a list of subpartitions created in accordance with the subpartition management policy. Statistics may also be employed, such as the min/max values of the column or columns on which the subpartitioning order is defined.

Non-conformant subpartitions may be split into a number of temporary structures, such as temporary disk files, prior to being merged into conformant subpartitions. Each structure may represent the same interval of data that the corresponding conformant subpartition represents. Once the data has been merged, the temporary structures may be deleted.

After non-conformant subpartitions are split into conformant subpartitions, sets of new conforming subpartitions may be merged. This step may involve, for example, locating a set of conformant subpartitions corresponding to the same interval and merging them to form a single conformant subpartition corresponding to the interval. Operation 504 depicts this step, in which split conformant subpartitions are merged into a reduced set of conformant subpartitions.

At operation 506, the number of active subpartitions may be limited according to the maximum number specified in the subpartitioning policy definition. The existing set of now-conformant subpartitions may be pruned so that no more than the maximum number of active subpartitions exists. This may involve determining a logical ordering of the subpartitions, so that the oldest or last-ordered subpartitions may be deleted.

After pruning the number of active subpartitions, a number of reserved subpartitions may be created. Operation 508 depicts creating empty subpartitions to accommodate new data that is expected to be added at some later time. The pre-existing subpartitioning scheme may have also created reserved partitions. If these are empty, they may be deleted, whereas if they contain data (or in other words have become active) they can be split during operation 502 and merged into conformant subpartitions during operation 504.

Once subpartitions conformant with the policy have been established, they may be monitored to maintain compliance with the desired arrangement on an ongoing basis. Various techniques, as described herein, may be employed. For example, a new reserved subpartition may be created when an existing reserved subpartition becomes active. The number of active subpartitions may also be checked, and any excess subpartitions removed.

Removing a subpartition may involve deleting or moving files corresponding to the subpartition, as well as updating local and global indexes that may refer to data in the subpartition. The index maintenance operations may be performed through the operation of a corresponding database management system, which may provide access to various routines for dropping subpartitions.

Figure 6:
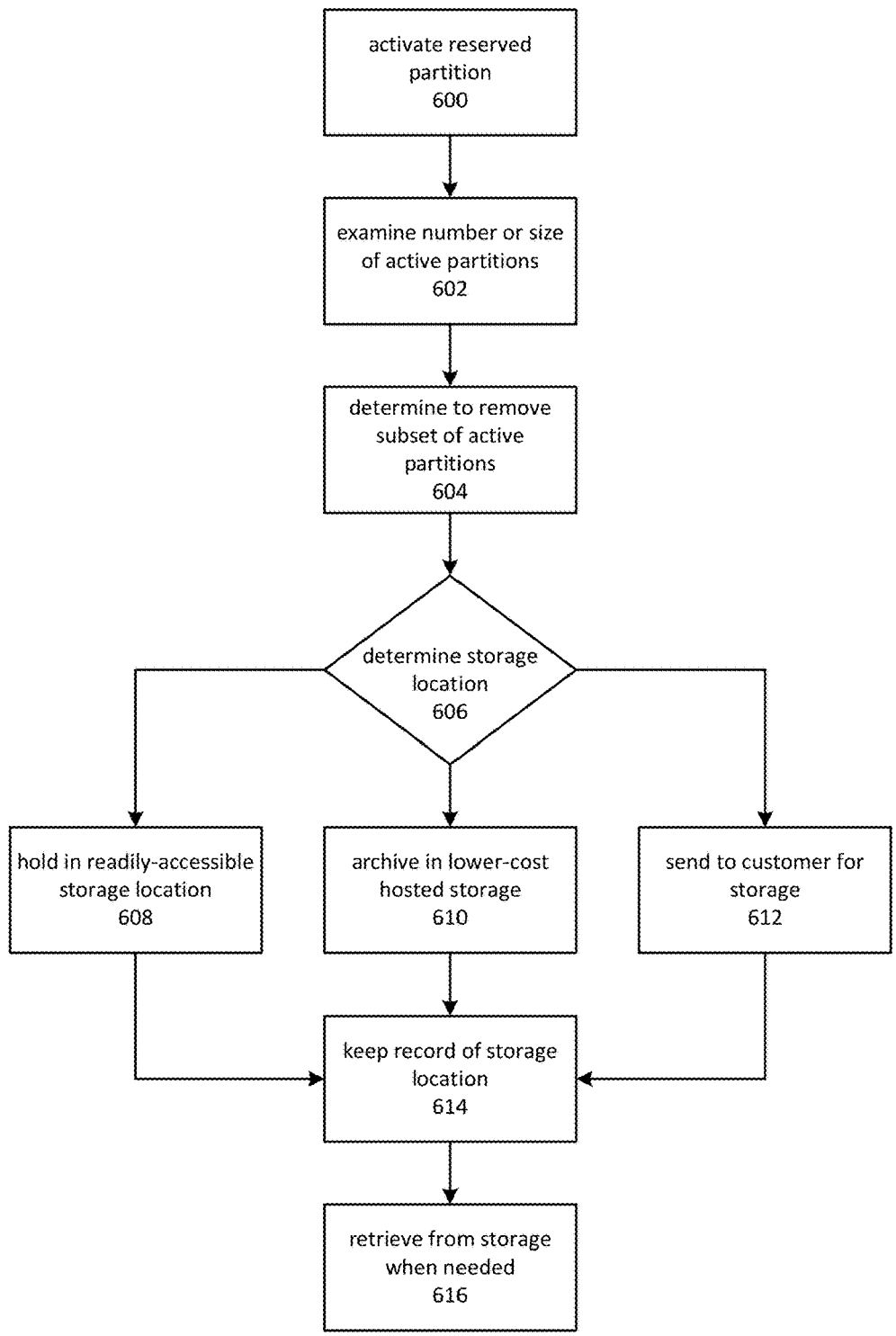
FIG. 6 is a flowchart depicting an embodiment for storing and retrieving subpartitions in cost-effective storage locations.

FIG. 6 depicts an embodiment of a technique for removing excess subpartitions. Although depicted as a sequence of operations, those of ordinary skill in the art will appreciate that at least some of the depicted operations may be altered, omitted, reordered or performed in parallel. Removing a subpartition may involve utilizing facilities of the database management system to drop the subpartition from the set of subpartitions it maintains.

Operation 600 depicts activating a reserved subpartition. This operation may be performed implicitly, for example when data corresponding to the interval represented by the subpartition is first stored. A trigger or other monitoring mechanism may allow for subpartitioning maintenance routines to be invoked when a reserved subpartition is activated.

When a reserved subpartition is activated, the number of active subpartitions increases. Accordingly, there may be a need to reduce the number of active subpartitions if there are currently more active subpartitions than indicated by the applicable subpartitioning policy. Operation 602 depicts determining the number or size of active subpartitions, and operation 604 depicts determining to remove a subset of the active partitions based on the number of size of active subpartitions. The subpartitioning policy may indicate a maximum number of active subpartitions. In some embodiments, the policy may specify a maximum size. This value may be used in place of a maximum number of active subpartitions, so that the number of active subpartitions is reduced until the size of those remaining is less than the maximum specified in the policy. The size may also be expressed in terms of the total size of all subpartitions, including reserved subpartitions.

The partitions to be removed may be deleted or moved to another storage location. The subpartitioning policy may include information indicating how removed subpartitions are to be handled. The policy might, for example, indicate that the removed subpartitions should be deleted. Operation 606 depicts determining where removed subpartitions should be stored, or that the removed subpartitions should be deleted rather than stored.

One storage option is depicted by operation 608. In some cases, embodiments may wish for the removed subpartitions to nevertheless be readily available. For example, the database management system may allow for removed subpartitions to be restored at a later time, if needed. This operation may be made more efficient by placing the removed subpartitions in a location that can be accessed relatively quickly. However, such storage locations may be relatively expensive compared to archival storage solutions. Operation 610 depicts storing the removed subpartitions in archival storage. Other forms of hosted storage service may be employed. In some embodiments, this type of storage may be less easily accessible than other forms of storage, but available at a lower cost. Another possibility, depicted by operation 612, involves transmitting the subpartition to the customer for storage at the customer's location, on a storage device provided by the customer.

Operation 614 depicts keeping a record of the storage location. Embodiments may perform this step for various reasons such as for reporting purposes, or to use in subsequently retrieving the data and restoring the subpartition. Embodiments may, however, use other techniques for locating the data other than those depicted by operation 614.

Operation 616 depicts retrieving the subpartitions from storage when needed. The retrieval may be performed by a process operating at the provider's data center, such as one operating on a partition, using the location recorded at operation 614. Embodiments may also accept files corresponding to a subpartition through an API, or use various other means. After retrieving files corresponding to subpartition, the subpartition may be restored using facilities provided by the database management system.

In various embodiments, providers of hosted database services may expose web service APIs or other mechanisms to customers to allow for retrieval of archived subpartitions, and to allow for archived subpartitions to be restored. In an embodiment, archived subpartitions may be restored to a database management system that mirrors the customer's production system, but contains only the restored data. This procedure allows the archived data to be searched, without affecting the live version of the database.

Embodiments may also move subpartitions from a production database to a secondary database, rather than moving the subpartitions directly to temporary storage. For example, a production database might be configured with a subpartitioning policy that retains the most recent four weeks of data, and indicates that all data greater than four weeks old should be transferred to a secondary database. The secondary database might, in turn, have a subpartitioning policy that indicates that subpartitions containing data more than one year old should be placed into long-term storage.

When transporting subpartitions to a secondary database, embodiments may also move associated indexes to the secondary database. The subpartition management policy may indicate that indexes should be moved. Embodiments may provide for a tablespace, schema name, or other mechanism to be used to identify groups of objects that should be moved. As a non-limiting example, a subpartition management policy might define a tablespace naming pattern incorporating the current month. Various indexes might also be defined as members of the tablespace corresponding to subpartitions also defined within the same tablespace. Furthermore, the subpartition management policy might indicate that all items in a namespace are to be moved, once each month, to a secondary database system and activated.

When subpartitions are removed, metadata indicative of the removed subpartitions may be retained. In addition, size information and related characteristics might be retained for various purposes, such as predicting future storage needs, generating reports and so forth. Information that might be retained includes the size of data contained in the subpartition, the amount of space reserved for the subpartition and so forth. Embodiments may also record various statistics and summary information regarding the data, so that customers may more easily locate data without having to restore each subpartition. Providers of hosted database services may provide various interfaces, such as web pages or APIs, to allow for the metadata to be examined and for the subpartitions to be retrieved or restored to a database when needed.

Subpartitioning policies may be defined in conjunction with, or be reflective of, data retention policies. For example, embodiments might retain metadata describing data retention policies for various types of data. This information may be arranged according to table. For example, data retention policies might indicate that data from one table should be retained for seven years, while data in another table need only be retained for one year. The information may be part of or correlated to a subpartitioning policy definition.

Embodiments of the present disclosure may be employed in conjunction with many types of database management systems ("DBMS"). A DBMS is a software and hardware system for maintaining an organized collection of data. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A DBMS may comprise various architectural components, such as a storage engine that acts to store data one on or more storage devices such as solid-state drives.

DBMSs may divide collections of data, such as tables or items collections, into partitions. The term partition may be used to refer to a subset of a table or item collection. However, because partitions may correspond on a one-to-one basis with computing nodes, the term partition may also be used to refer to a computing node that hosts a partition.

Figure 7:
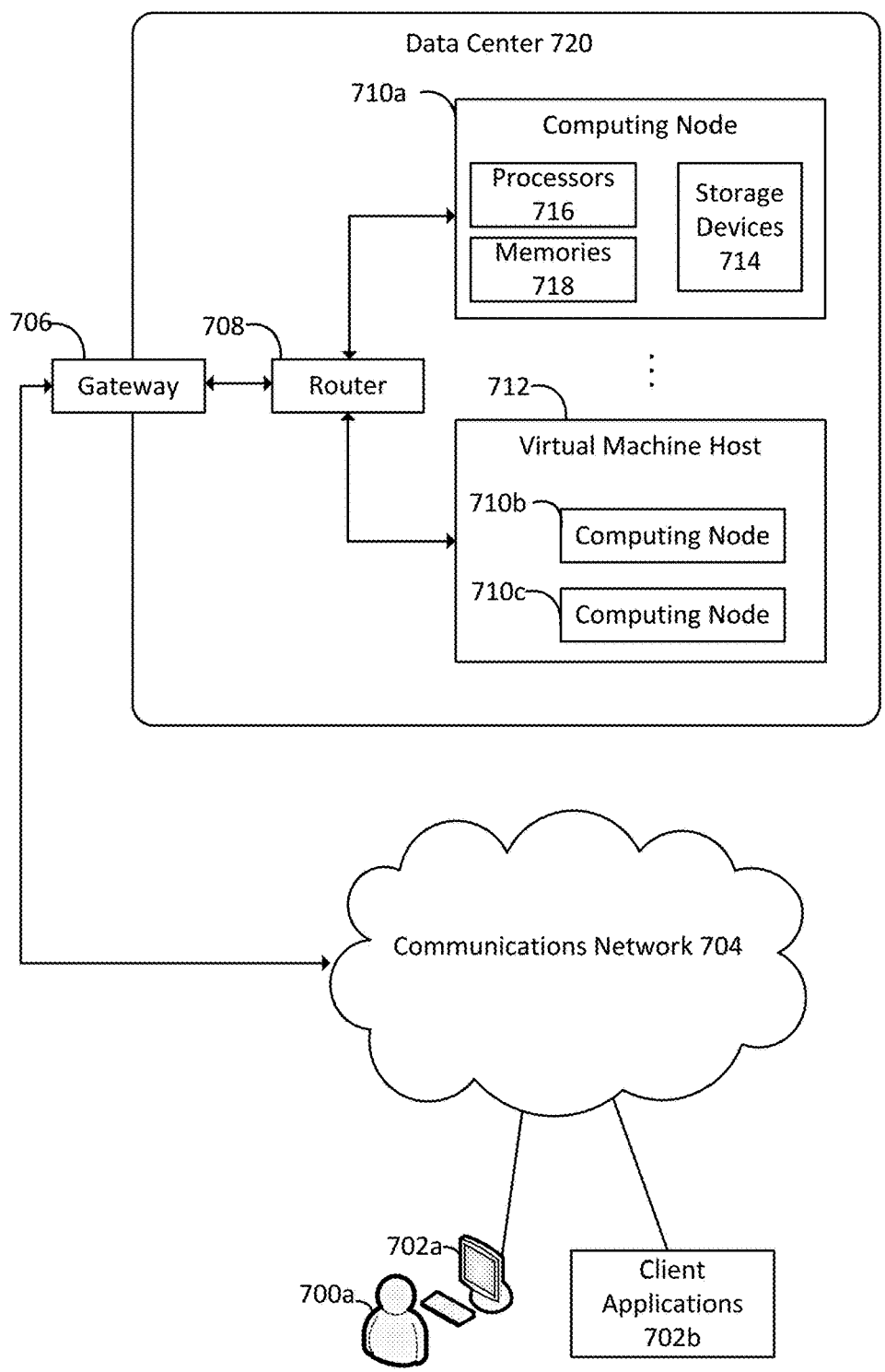
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b and 710c within a data center 720. Alternatively, client applications 702b may communicate without user intervention. Communications network 704 may comprise any combination of communications technology, including the Internet, wired and wireless local area networks, fiber optic networks, satellite communications and so forth. Any number of networking protocols may be employed.

Communication with processes executing on the computing nodes 710a, 710b and 710c, operating within data center 720, may be provided via gateway 706 and router 708. Numerous other network configurations may also be employed. Although not explicitly depicted in FIG. 7, various authentication mechanisms, web service layers, business objects or other intermediate layers may be provided to mediate communication with the processes executing on computing nodes 710a, 710b and 710c. Some of these intermediate layers may themselves comprise processes executing on one or more of the computing nodes. Computing nodes 710a, 710b and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718 and one or more storage devices 714. Processes on computing node 710a may execute in conjunction with an operating system or alternatively may execute as a bare-metal process that directly interacts with physical resources such as processors 716, memories 718 or storage devices 714.

Computing nodes 710b and 710c are depicted as operating on virtual machine host 712, which may provide shared access to various physical resources such as physical processors, memory and storage devices. Any number of virtualization mechanisms might be employed to host the computing nodes. Computing nodes 710b and 710c may comprise virtual memory, virtual processors and other virtualized representations of computing resources. Embodiments of the present disclosure may therefore comprise virtual processors and virtual memories configured to perform operations consistent with the techniques disclosed herein.

The various computing nodes depicted in FIG. 7 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A database management system comprising:
    one or more storage devices configured to store thereon one or more files corresponding to data of a partition of a database table, the data having corresponding time information; and
    one or more memories having stored thereon computer-readable instructions that, upon execution, cause the system at least to:
        store, on at least one of the one or more storage devices, a plurality of subpartitions of the partition, each subpartition having an assigned time interval and containing a subset of the data, the subset of the data having corresponding time information within the assigned time interval;
        store, on at least one of the one or more storage devices, another subpartition upon determining that a count of the plurality of subpartitions is less than a minimum number of subpartitions, the another subpartition having an another assigned time interval later in time relative to the assigned time interval assigned to each subpartition in the plurality of subpartitions and containing data having corresponding time information within the another assigned time interval; and
        remove, from the at least one of the one or more storage devices, one of the plurality of subpartitions when a count of subpartitions exceeds a value indicative of a maximum number of subpartitions, the removed one of the plurality of subpartitions having an earliest assigned time interval.

2. The system of claim 1, further comprising one or more memories having stored thereon computer-readable instructions that, upon execution, cause the system at least to:
    name the another subpartition using a naming pattern indicative of the another assigned time interval.

3. The system of claim 1, further comprising one or more memories having stored thereon computer-readable instructions that, upon execution, cause the system at least to:
    reserve space in the another subpartition based at least in part on an expected amount of data to be stored in the another subpartition.

4. The system of claim 1, further comprising one or more memories having stored thereon computer-readable instructions that, upon execution, cause the system at least to:
    cause the removed one of the plurality of subpartitions to be stored on one or more of hosted storage, archival storage, customer-provided storage, and a secondary database management system.

5. A computer-implemented method comprising:
    storing, by a computing node, a plurality of subpartitions of a partition of a database table, each subpartition having an assigned interval and containing a subset of data associated with the partition, the subset of the data comprising corresponding ordering information within the assigned interval;
    storing, by a computing node, another subpartition upon determining that a count of the plurality of subpartitions is less than a minimum number of subpartitions, the another subpartition containing data within a last-ordered assigned interval relative to the assigned interval of each subpartition in the plurality of subpartitions; and
    removing, by a computing node, one of the plurality of subpartitions when a count of subpartitions exceeds a value indicative of a maximum number of subpartitions, the removed one of the plurality of subpartitions having a first-ordered assigned interval.

6. The method of claim 5, further comprising:
    naming the another subpartition to conform with a naming pattern indicative of the assigned interval.

7. The method of claim 5, wherein the subset of the data corresponds to a plurality of preexisting subpartitions, the plurality of preexisting subpartitions each having a second assigned interval different than the assigned interval.

8. The method of claim 7, further comprising:
    forming a plurality of temporary subpartition structures corresponding to the plurality of preexisting subpartitions, the plurality of temporary subpartitions corresponding to the second interval.

9. The method of claim 5, further comprising:
    reserving space in the another subpartition based at least in part on an expected amount of data to be stored in the another subpartition.

10. The method of claim 5, further comprising:
    causing the removed one of the plurality of subpartitions to be stored on one or more of hosted storage, archival storage, customer-provided storage, and a secondary database management system.

11. The method of claim 10, further comprising:
retrieving the removed one of the plurality of subpartitions from one of hosted storage, archival storage, or customer-provided storage.

12. The method of claim 5, further comprising:
causing the removed one of the plurality of subpartitions to be activated on a secondary database management system.

13. The method of claim 5, wherein the last-ordered assigned interval is a future interval.

14. A non-transitory computer-readable storage medium having stored thereon instructions that, upon execution by a computing device, cause the computing device at least to:
store a plurality of subpartitions of a partition of a database table, each subpartition having an assigned interval and containing a subset of data associated with the partition, the subset of the data comprising corresponding ordering information within the assigned interval;
store another subpartition upon determining that a count of the plurality of subpartitions is less than a minimum number of subpartitions, the another subpartition containing data in a last-ordered assigned interval relative to the assigned interval of each subpartition in the plurality of subpartitions; and
remove one of the plurality of subpartitions when a count of subpartitions exceeds a value indicative of a maximum number of subpartitions, the removed one of the plurality of subpartitions having a first-ordered assigned interval.

15. The non-transitory computer-readable medium of claim 14, comprising further instructions that, upon execution by the computing device, cause the computing device to at least:
copy data from a preexisting subpartition that does not conform to a subpartition management policy to at least one of the plurality of subpartitions.

16. The non-transitory computer-readable medium of claim 15, comprising further instructions that, upon execution by the computing device, cause the computing device to at least:
remove the subpartition that does not conform to the subpartition management policy.

17. The non-transitory computer-readable medium of claim 14, comprising further instructions that, upon execution by the computing device, cause the computing device to at least: store information indicative of a subpartition management policy in a second database table.

18. The non-transitory computer-readable medium of claim 14, comprising further instructions that, upon execution by the computing device, cause the computing device to at least:
reserve space in another subpartition based at least in part on an expected amount of data to be stored in the another subpartition.

19. The non-transitory computer-readable medium of claim 14, comprising further instructions that, upon execution by the computing device, cause the computing device to at least:
name the another subpartition using a naming pattern comprising a prefix and a suffix pattern.

20. The non-transitory computer-readable medium of claim 14, wherein removing a subpartition comprises one or more of causing a database to drop the removed subpartition, deleting files corresponding to the removed subpartition, copying files corresponding to the removed subpartition, archiving files corresponding to the removed subpartition, or sending files corresponding to the removed subpartition to a customer.

* * * * *